(12) United States Patent
Schmidt Dios

(10) Patent No.: US 7,748,562 B2
(45) Date of Patent: Jul. 6, 2010

(54) CONTAINER DEVICE FOR AN ENVIRONMENTAL HUMIDITY ABSORBER WITH AN ANTI-SPILL SYSTEM

(75) Inventor: Eva Schmidt Dios, Tarragona (ES)

(73) Assignee: Top Grade, S.L., Tarragona (ES)

( * ) Notice: Subject to any disclaimer, the term of this patent is extended or adjusted under 35 U.S.C. 154(b) by 279 days.

(21) Appl. No.: 12/106,271

(22) Filed: Apr. 19, 2008

(65) Prior Publication Data
US 2009/0071027 A1    Mar. 19, 2009

(30) Foreign Application Priority Data
Sep. 18, 2007    (EP)    ................... 07381064

(51) Int. Cl.
| | | |
|---|---|---|
| B65D 1/34 | (2006.01) | |
| B65D 51/16 | (2006.01) | |
| B65D 21/00 | (2006.01) | |
| B65D 85/62 | (2006.01) | |
| B65D 6/04 | (2006.01) | |
| F16C 1/00 | (2006.01) | |
| F17C 3/00 | (2006.01) | |
| F17C 13/00 | (2006.01) | |
| F26B 21/06 | (2006.01) | |
| F26B 19/00 | (2006.01) | |
| F26B 25/06 | (2006.01) | |

(52) U.S. Cl. ............... 220/571; 220/571.1; 220/560.03; 220/367.1; 206/514; 206/562; 34/80; 34/218

(58) Field of Classification Search ................ 220/571, 220/571.1, 560.03, 573.4, 504; 206/514, 206/562; 34/80, 218
See application file for complete search history.

(56) References Cited

U.S. PATENT DOCUMENTS
| | | | |
|---|---|---|---|
| 5,215,561 A | | 6/1993 | Cameron |
| 5,931,082 A | * | 8/1999 | Kim et al. ...................... 99/342 |
| 6,463,844 B1 | * | 10/2002 | Wang et al. ................... 99/426 |
| 6,840,396 B2 | * | 1/2005 | Wuestman ............. 220/592.28 |
| 6,931,755 B1 | | 8/2005 | Hsu |

FOREIGN PATENT DOCUMENTS
| | | |
|---|---|---|
| EP | 1190760 | 3/2002 |
| EP | 1619450 | 1/2006 |

(Continued)

OTHER PUBLICATIONS

Mar. 12, 2008, EP Search Report EP 07381064.

Primary Examiner—Anthony Stashick
Assistant Examiner—Andrew T Kirsch
(74) Attorney, Agent, or Firm—Neifeld IP Law, PC

(57) ABSTRACT

Container device for an environmental humidity absorber with an anti-spill system which comprises
A lower receptable to collect saline liquid with a recessed rib that fits into a peripheral flange in an outer part of a wall of a tray for hygroscopic material, disposed over the upper edge of the receptable;
A drainage tube that extends vertically inserted in a central drainage hole of the receptable embedded into the base of the tray
An upper lid with ventilation holes, a lateral peripheral flap over the tray wall and with a lower peripheral flange Recessed projections that fit into the complementary openings of respective horizontal recessed tongues that emerge from opposite sides of the lid, emerge from at least two respective opposing segments of the wall of the tray.

15 Claims, 21 Drawing Sheets

FOREIGN PATENT DOCUMENTS

| | | |
|---|---|---|
| FR | 2414948 | 8/1979 |
| FR | 2627400 | 8/1989 |
| FR | 2627401 | 8/1989 |
| FR | 2857275 | 1/2005 |
| WO | 9910082 | 3/1999 |

* cited by examiner

CONTAINER DEVICE FOR AN ENVIRONMENTAL HUMIDITY ABSORBER WITH AN ANTI-SPILL SYSTEM

This application claims priority to European Patent Application EP 07381064.0, filed Sep. 18, 2007.

The contents of EP 07381064.0, filed Sep. 18, 2007 are incorporated herein by reference.

TECHNICAL FIELD OF THE INVENTION

The present invention relates to the technical field of containers for environmental humidity absorbing materials, and specifically in the field of containers for environmental humidity absorbers with an anti-spill system to prevent liquid from spilling if the device tips over.

PRIOR ART

At present, humidity absorbers are increasingly being used to dehumidify closed spaces such as bedrooms, closets, warehouses, offices, etc. as they reduce excessive environmental humidity levels that can be harmful to the objects located in said spaces and even unhealthy for people who remain in such closed spaces for long periods of time. The absorbing material which has been used for many years now, and more frequently for this type of dehumidification, is based on calcium chloride crystals which, due to their strong hygroscopic nature, are highly efficient.

Containers for these types of hygroscopic materials are usually comprised of a receptacle, a tray containing the hygroscopic material and with drainage holes which allow the liquid produced when the hygroscopic material is saturated with environmental humidity to drip into the receptacle, and a lid with ventilation holes which allow the absorbent material to be in contact with the environmental air that must be dehumidified. Said containers are disclosed, for example, in French patent applications FR-A-2578444 and FR-A-2658736, in German patent DE-533061-C and in Spanish industrial model numbers ES-U-237599, ES-U-280232, ES-U-281827, ES-U-1003028, ES-1012272-U, ES-1038304-U and ES-1038452-U. Plastic containers are marketed by various companies such as, for example, SODEPAC, in France, under the brand name HUMIDIVORE, RUBSON, in France, and by HUMEX, S.A., in Spain, under the brand name HUMYDRY.

The container devices of the previously described type have the drawback, when they accidentally tip over, of spilling the saline liquid collected in the receptacle through the holes of the tray and onto the surface area surrounding the fallen device. Due to the relatively abrasive nature of the liquid, such spills stain the surrounding area and consequently leave said liquid within reach of children or pets, which can suffer burns or even, in case of ingestion, poisoning. In order to overcome this drawback, container devices for environmental humidity absorbers have been designed in which the support tray does not have drainage holes but rather anti-spill systems which, while allowing the liquid produced by the hygroscopic material to drip into the receptacle, in case of tipping over, prevent the liquid from spilling out of the receptacle. Said devices with anti-spill systems are disclosed, for example, in the Addition Certificate application for French patent FR-A-2627400, in French patent application FR-2578444 and in European Patent EP-A-1619450.

The device disclosed in the Addition Certificate application for French patent FR-A-2627400 is comprised of a lower saline liquid-collection receptacle, a support tray for the hygroscopic material sealed to the upper edge of the receptacle, and a lid with ventilation holes. In this device, the support tray does not have a plurality of drainage holes but rather a drainage tube that emerges centrally from underneath the tray and extends vertically towards the bottom of the receptacle to act as an overflow tank in the event the device tips over. The liquid resulting from the saturation of the environmental humidity-absorbing hygroscopic material drips onto the tray and then drains through the drainage tube into the receptacle. When the device tips over 180°, in such a way that it rests on the lid, said lid retains the liquid inside the receptacle, provided that the volume of liquid is not so high that the level reached inside the fallen receptacle exceeds the space between the bottom of the receptacle and the free end of the drainage tube. On the other hand, when the device tips over 90° and therefore rests on one of its sides, the liquid is retained by the lid, provided that the volume is not so high that the level reached inside the fallen receptacle exceeds the distance from one of the side walls to the drainage tube. In an attempt to overcome the limitation created by the inefficiency of the anti-spill effect in case of tip-over imposed by the volume and, therefore, the level reached by the liquid inside the receptacle, in an embodiment of the Addition Certificate application for French patent FR-A-2627400 the free lower end of the central drainage tube has a flap that closes in the manner of a non-return valve when the device tips over 180° on its upper base. However, the Addition Certificate application for French patent FR-A-2627400 does not describe how to efficiently form the removable seal between the tray and the receptacle nor how to seal the upper lid to the receptacle or tray, nor how these three elements can be joined together by a removable seal in such a way as to save space when packaging the device, for example, for storage and transport.

European Patent application EP-A-1619450 describes a device comprised of a lower saline liquid-collection receptacle, a support tray for hygroscopic material sealed to the edge of the receptacle, and a lid with ventilation holes, in which said support tray does not have a plurality of drainage holes but rather an anti-spill barrier formed by a drainage channel that extends between a first hole that drains into the upper side of the tray and a second channel hole that drains into the lower side of the tray, extending with a slight downward tilt from the first hole towards the second hole. This device has, on one hand, the drawback of requiring a very complex support tray structure and, on the other, the inconvenience of the channel's slight downward tilt, which makes it susceptible to obstruction by foreign objects such as detached or re-crystallized hygroscopic particles.

It was therefore necessary to develop a container device for an environmental humidity absorber with an anti-spill system that could overcome the drawbacks of the aforementioned state-of-the-art.

DESCRIPTION OF THE INVENTION

The present invention refers to a container device for an environmental humidity absorber with an anti-spill system, comprised of a lower receptacle to collect saline liquid, with a bottom, wall and upper edge that defines an upper inlet, a support tray for hygroscopic material contained in a permeable receptacle sealed to the upper edge of the receptacle, the base of which has an upper surface tilted towards and around a central drainage hole, with a wall that peripherally defines the upper edge of the tray, a lower surface and a drainage tube that extends vertically from the drainage hole towards the bottom of the receptacle and which comprises an upper inlet, a downward part and a lower outlet separated from the bottom of the receptacle.

The device of the present invention also has an upper lid with ventilation holes, disposed over the tray and with less height than the inner height of the receptacle, in which:

the receptacle comprises a recessed rib that emerges peripherally from an inner upper section of its wall and its into a peripheral recess in an outer part of the tray wall;

the lid comprises a peripheral flap that projects sideways thereof and which rests on the tray wall, and a lower peripheral flange in contact with an inner part of the tray wall;

the vertical recessed projections emerge from least two respective opposing segments of the tray wall and are embedded into the complementary openings of respective horizontal recessed tongues that emerge from either side of the lid; and the drainage tube is removably embedded into the base of the tray.

When the container device of the invention has a substantially square or circular cross-section, a single pair of recessed projections on the tray and one pair of complementary recessed tongues are initially sufficient. On the other hand, when the device has a cross-section with elongated or ovally elongated sides, it could be convenient to provide at least another pair of recessed projections and tongues which in this case would be located on both lateral segments of the tray and lid, respectively.

In a preferred embodiment of the invention, the support tray also comprises an outer flap that extends vertically downwards, and a horizontal support segment that extends towards the exterior of the tray and joins the outer flap to the tray wall, in such a way that a gap into which the upper part of the receptacle wall fits is defined between the outer flap, the support segment and the tray wall. According to this embodiment, the aforementioned outer tray flap can also comprise an upper vertical extension that surrounds at least one lower section of the lid. Similarly, according to this embodiment, in at least one of the wall segments from which the recessed projections emerge, the upper vertical extension of the outer tray flap comprises an opening for the recessed projection that forms an access to the horizontal recessed tongue of the lid.

In an embodiment of the recessed tube, its inlet is surrounded by a ring widening that fits into the complementary ring slot surrounding the drainage hole. At least one recessed swivel that is embedded into a recessed orifice in the base of the tray emerges from the bottom of said widening.

Preferably, the support tray also comprises an orifice through which the liquid collected in the receptacle is evacuated, said orifice being sealable by means of a removable plug such as, for example, a plug inserted under pressure or screwed. Preferably, the evacuation orifice is located close to at least one tray wall segment and as far as possible from the drainage hole, in order to prevent liquid from spilling through the drainage hole when the user turns over the device so that the saline liquid can drain out of the receptacle through the evacuation orifice. In this way, when the tray of the device has a substantially polygonal cross-section such as, for example, a triangular or square section, the evacuation orifice is located close to the two adjacent parts of the support tray wall.

In order to allow the saline liquid that drips from the hygroscopic material contained in the flexible receptacle to flow towards and through the drainage hole, the upper surface of the support tray base has a plurality of vertical support projections on which the permeable receptacle with the hygroscopic material rests. Preferably, this plurality of support projections comprise central support projections disposed radially around the drainage hole, and lateral support projections disposed between the drainage hole and tray wall. The radial support projections can be higher than the lateral support projections in order to prevent the hygroscopic material from blocking the drainage hole. Similarly, the upper surface of the tray can have centering projections to maintain the receptacle that contains the hygroscopic material in a stable, centered position.

The shape and arrangement of the aforementioned elements allows the receptacle, tray, drainage hole, upper lid and tube to be disposed in a transport or storage position that occupies less space than its assembled position. In said transport or storage position, the lid is turned 180° and is disposed inside the receptacle in such a way that the peripheral flap rests on the upper edge of the receptacle and the recessed tongue is inserted into the upper edge of the receptacle. The tray is also turned 180° and is disposed in such a way that its inner wall is in contact with the outer part of the peripheral lower vertical flange of the lid, while its support segment rests on the peripheral flap and the recessed tongue of the lid. In turn, the recessed projection of the tray is embedded into the opening of the recessed tongue.

The inner flap of the tray is turned upwards so as to provide a support means to pile another device. In order to cooperate with said inner flap, the receptacle may additionally comprise a support flap that extends vertically downwards from its bottom. Said support flap of the piled device receptacle surrounds or is inserted into the inner flap of the device tray on which it is piled. In this way, the bottom ($1b'$) of the piled device receptacle rests on the free edge of the support flap of the device on which it is piled or, in another embodiment, on the inner surface turned upwards, of the tray of the device on which it is piled.

On the other hand, the tube has been disassembled and is inserted into the lid.

We can therefore observe that the device of the present invention offers substantial functional and structural improvements with respect to the dehumidifying devices of the previously described state of the art.

BRIEF DESCRIPTION OF THE DRAWINGS

Practical embodiments of the constituent elements of the device of the present invention have been represented in the following figures.

Figure 1:
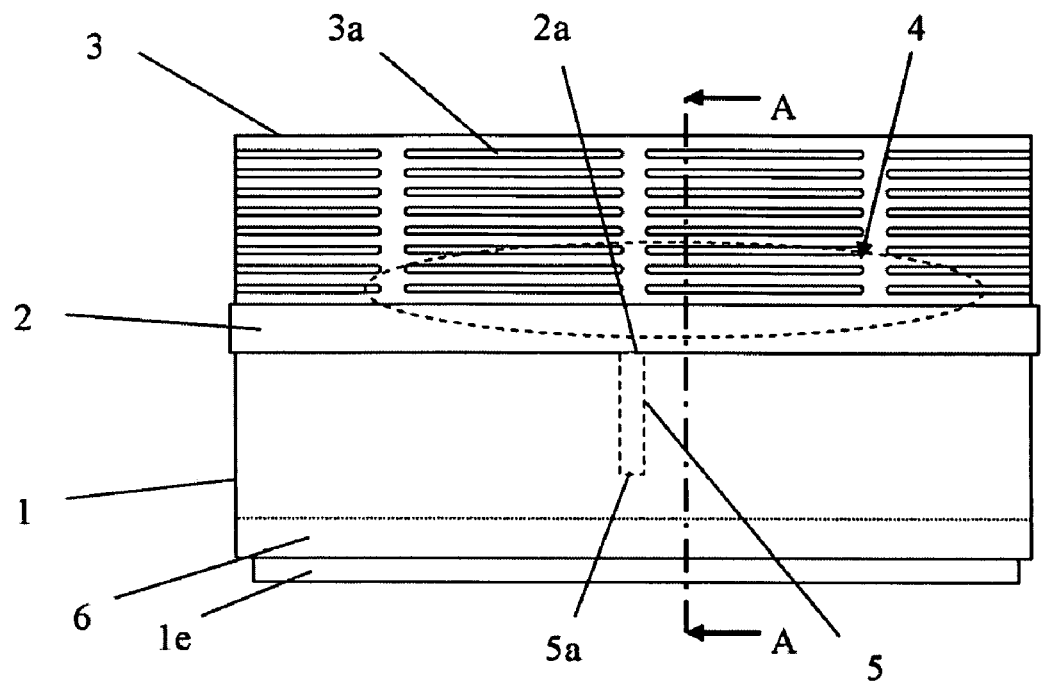
FIG. 1 shows a schematic elevational side view of a first embodiment of the device of the present invention.
Figure 2:
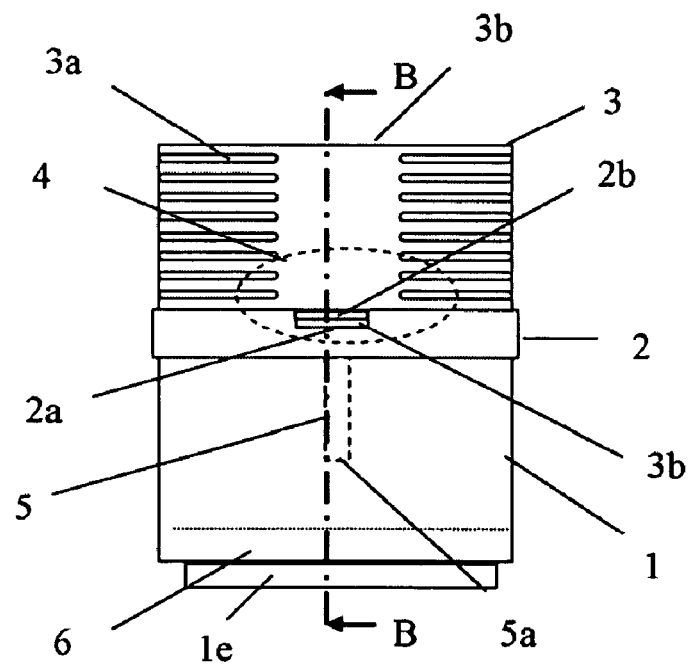
FIG. 2 shows a schematic elevational front view of the device represented in FIG. 1.
Figure 3:
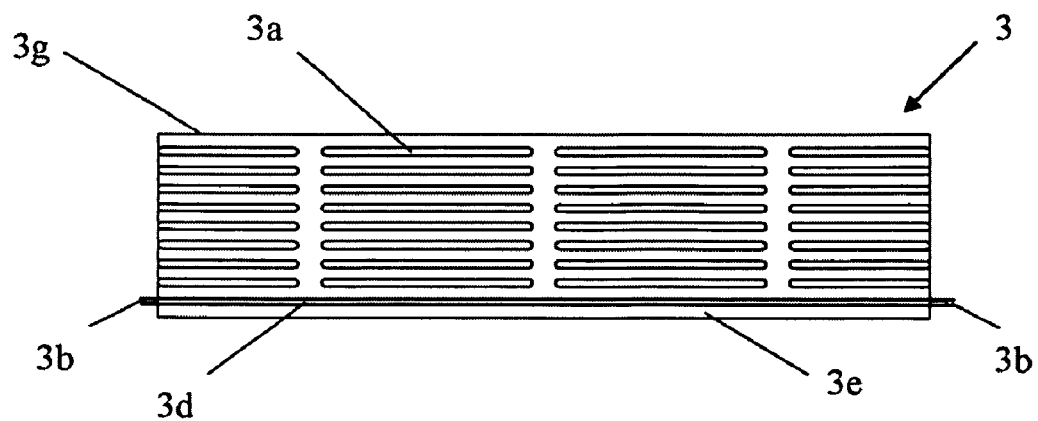
FIG. 3 shows a schematic elevational side view of the lid of the device represented in FIG. 1.
Figure 4:
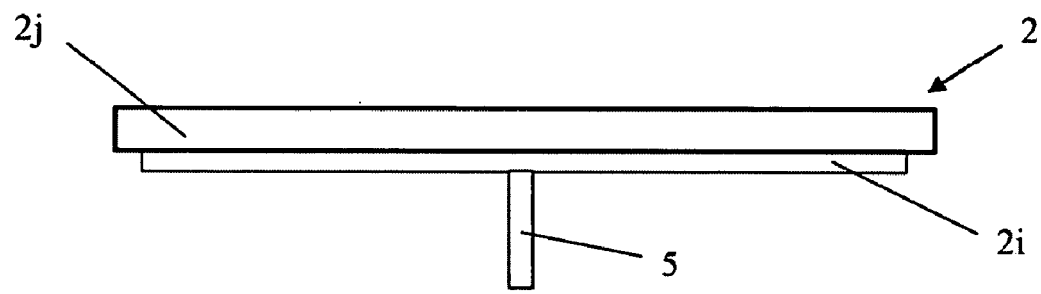
FIG. 4 shows a schematic elevational side view of the support tray of the device represented in FIG. 1.
Figure 5:
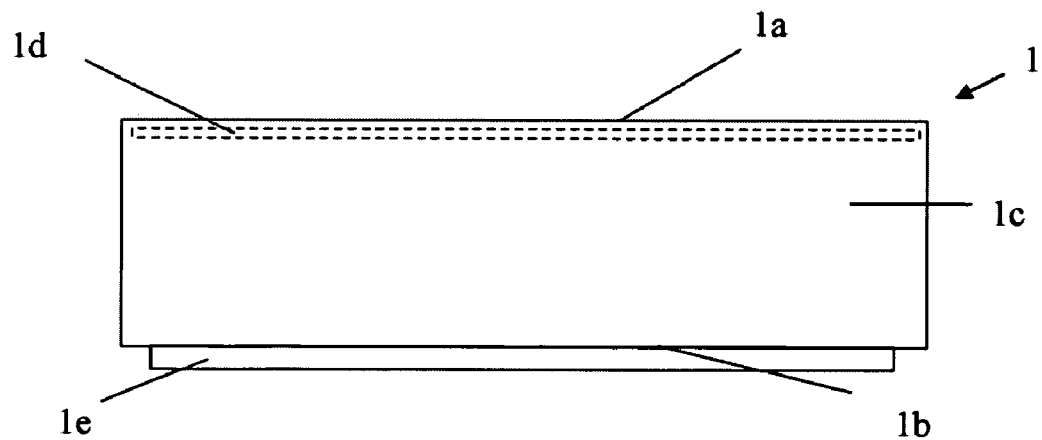
FIG. 5 shows a schematic elevational side view of the receptacle of the device represented in FIG. 1.
Figure 6:
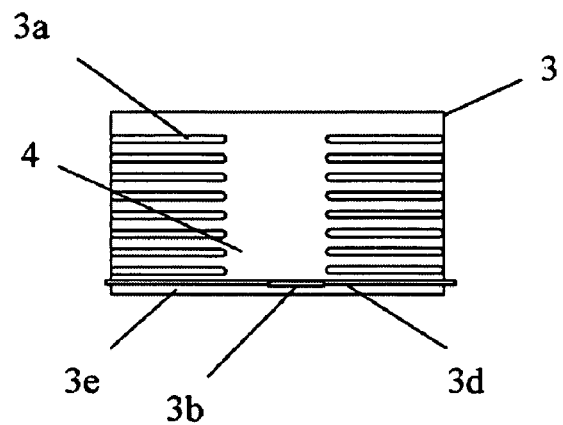
FIG. 6 shows a schematic elevational front view of the lid of the device represented in FIG. 1.
Figure 7:
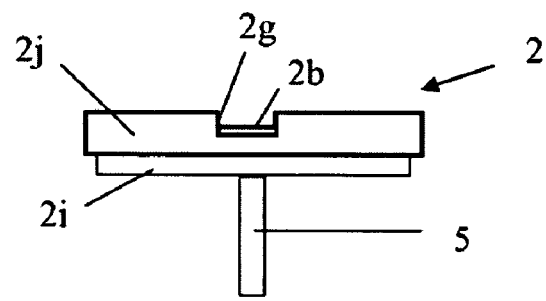
FIG. 7 shows a schematic elevational front view of the support tray of the device represented in FIG. 1.
Figure 8:
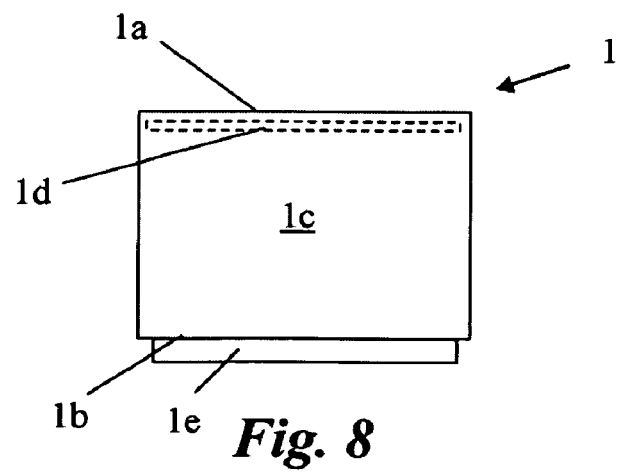
FIG. 8 shows a schematic elevational front view of the receptacle of the device represented in FIG. 1.
Figure 9:
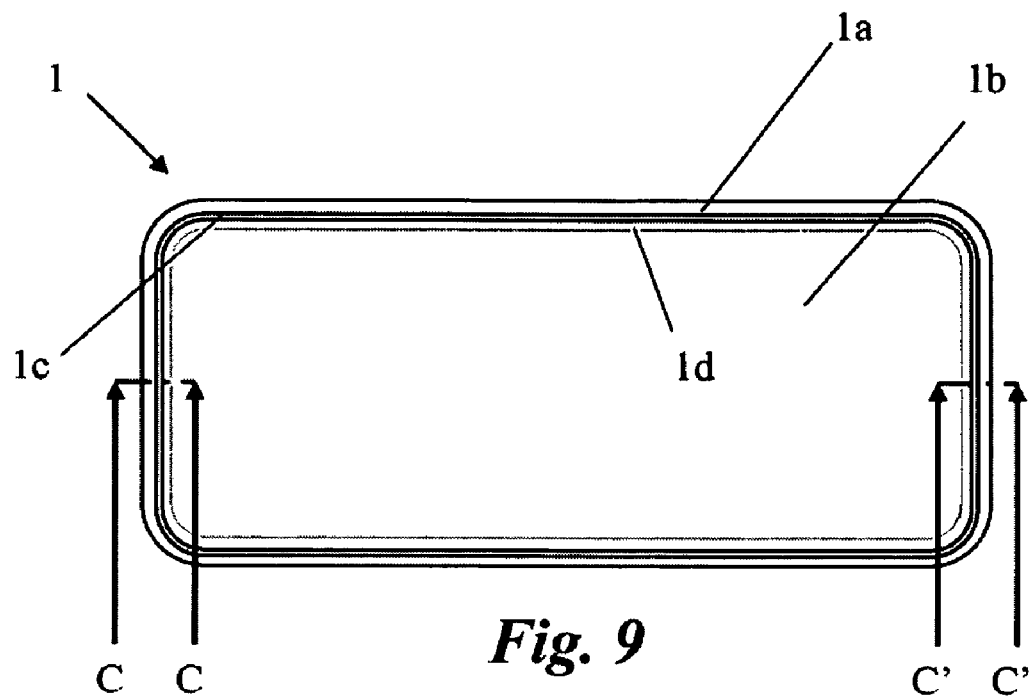
FIG. 9 shows a schematic upper plan view of an embodiment of the receptacle of the device represented in FIG. 1.
Figure 10:
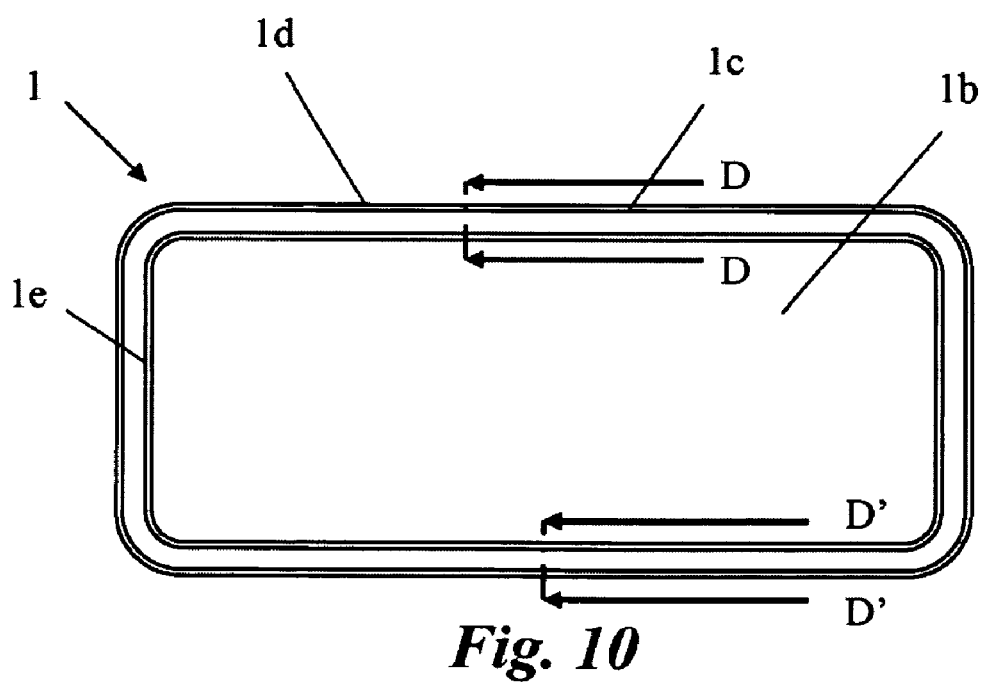
FIG. 10 shows a schematic lower plan view of an embodiment of the receptacle of the device represented in FIG. 1.
Figure 11:
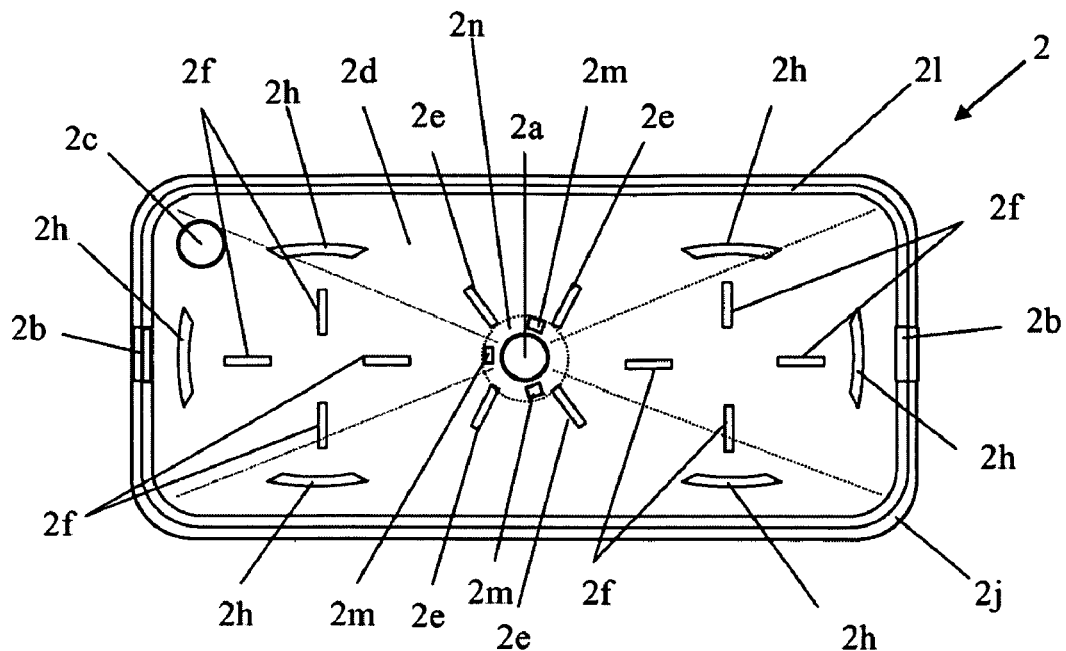
FIG. 11 shows a schematic upper plan view of an embodiment of the support tray of the device represented in FIG. 1.
Figure 12:
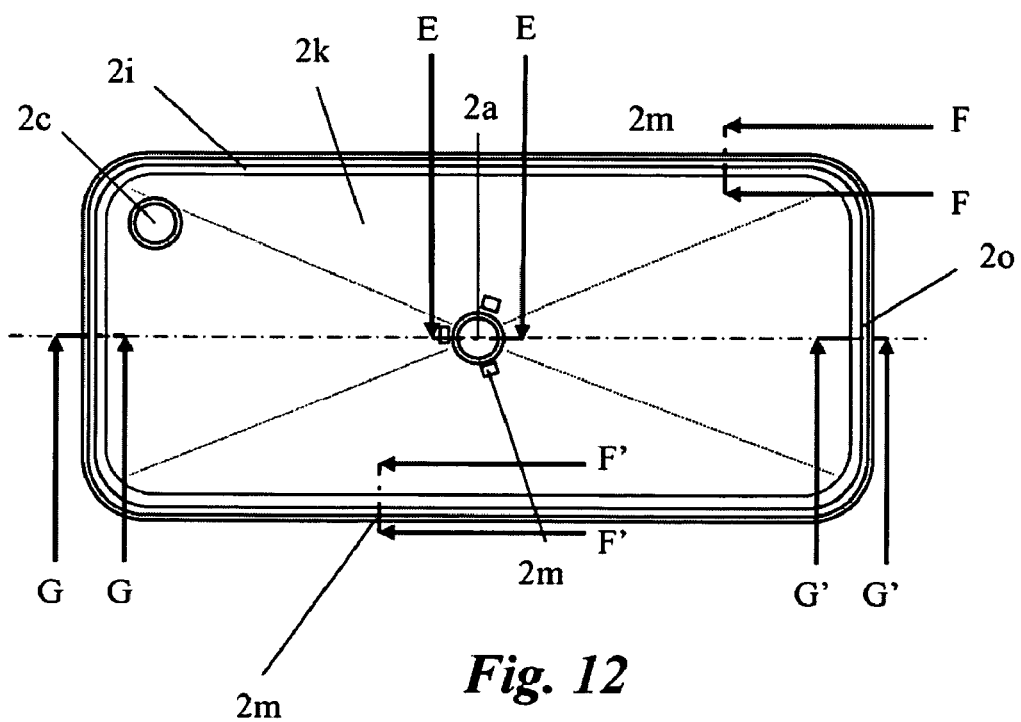
FIG. 12 shows a schematic lower plan view of an embodiment of the support tray of the device represented in FIG. 1.
Figure 13:
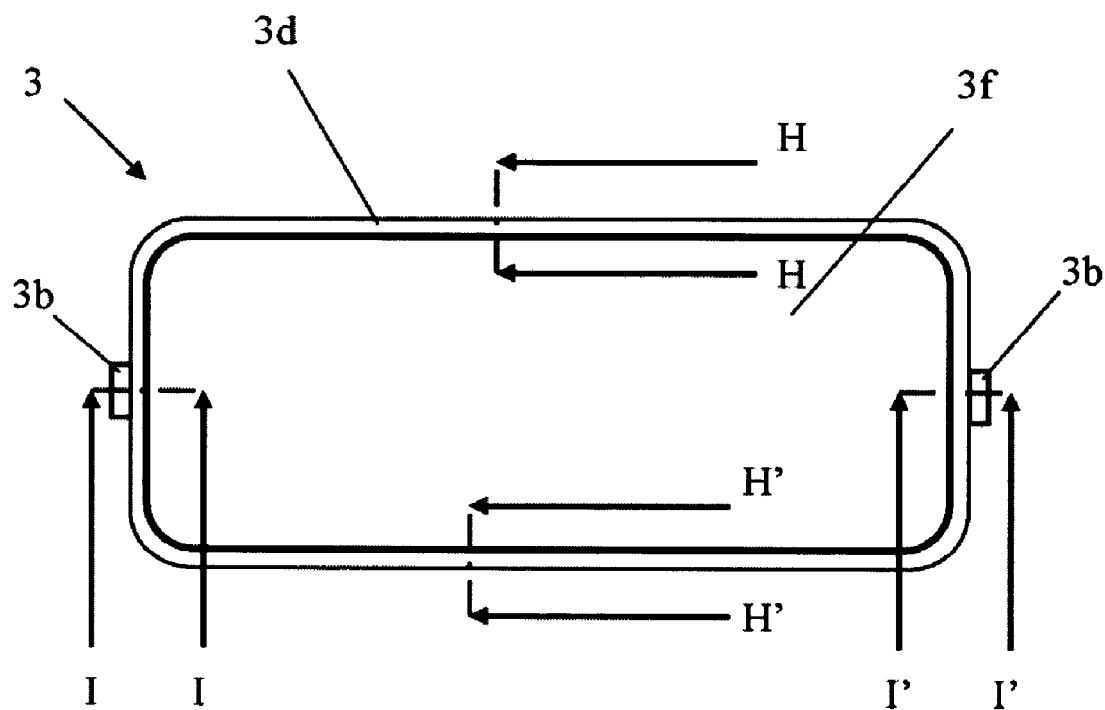
FIG. 13 shows a schematic upper plan view of an embodiment of the lid of the device represented in FIG. 1.
Figure 14:
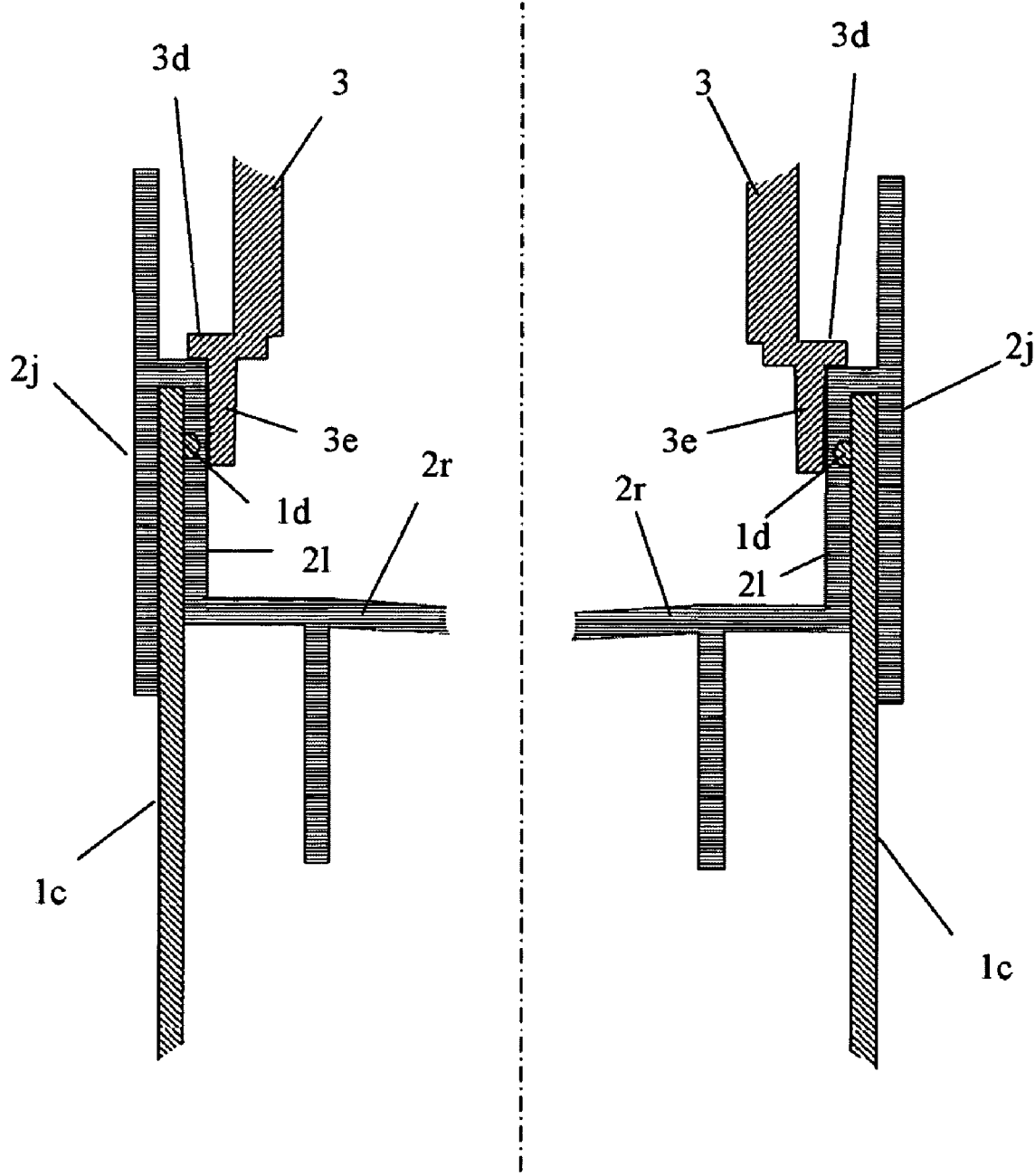
FIG. 14 shows a schematic sectional side view along plane A-A of the device shown in FIG. 1.
Figure 15:
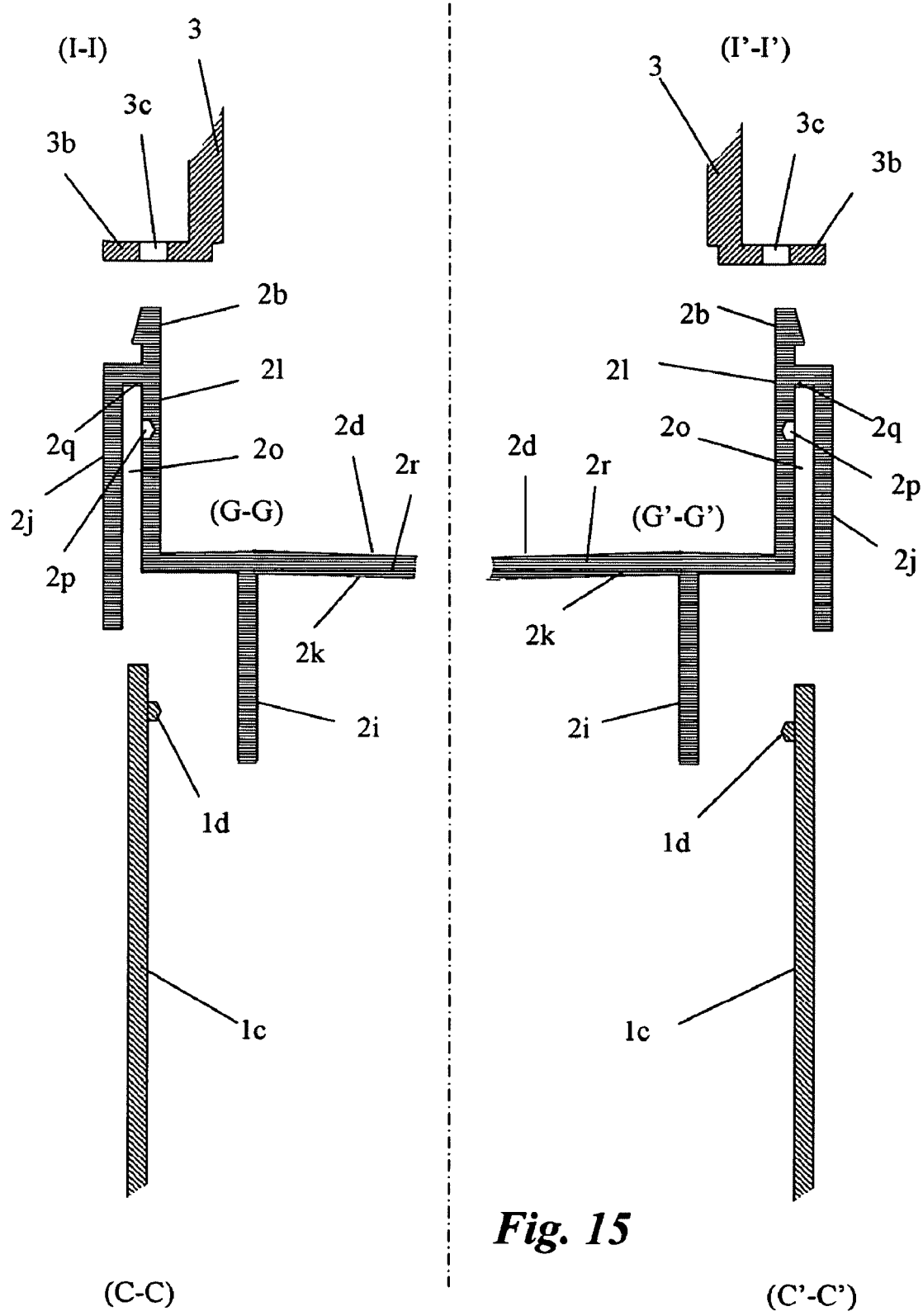
FIG. 15 corresponds to schematic sectional side views along planes C-C, C'-C' of the receptacle shown in FIG. 9, G-G, G'-G' of the support tray shown in FIG. 12, and I-I, I'-I' of the lid shown in FIG. 13.
Figure 16:
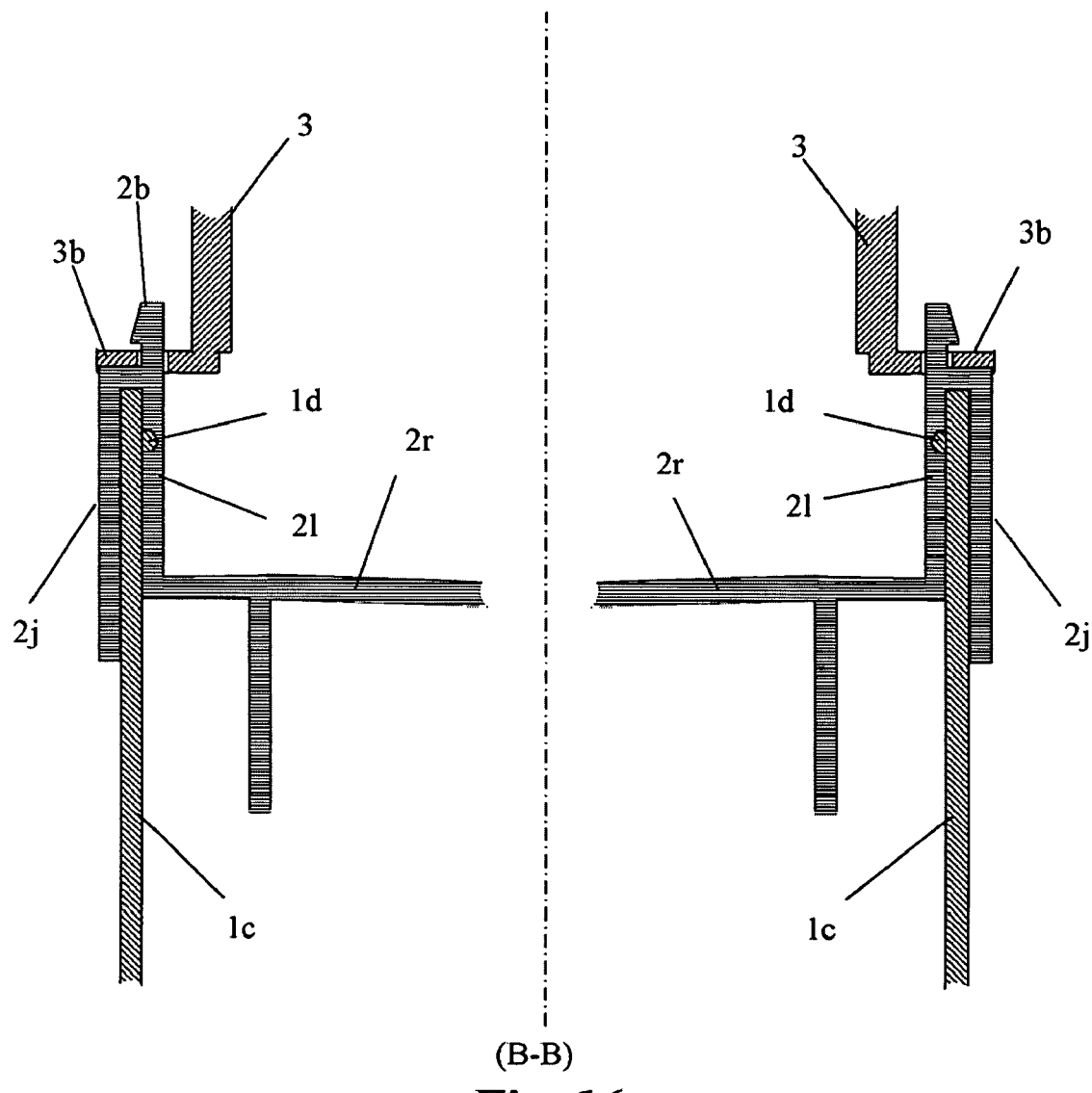
FIG. 16 shows a schematic sectional side view along plane B-B of the device shown in FIG. 2.
Figure 17:
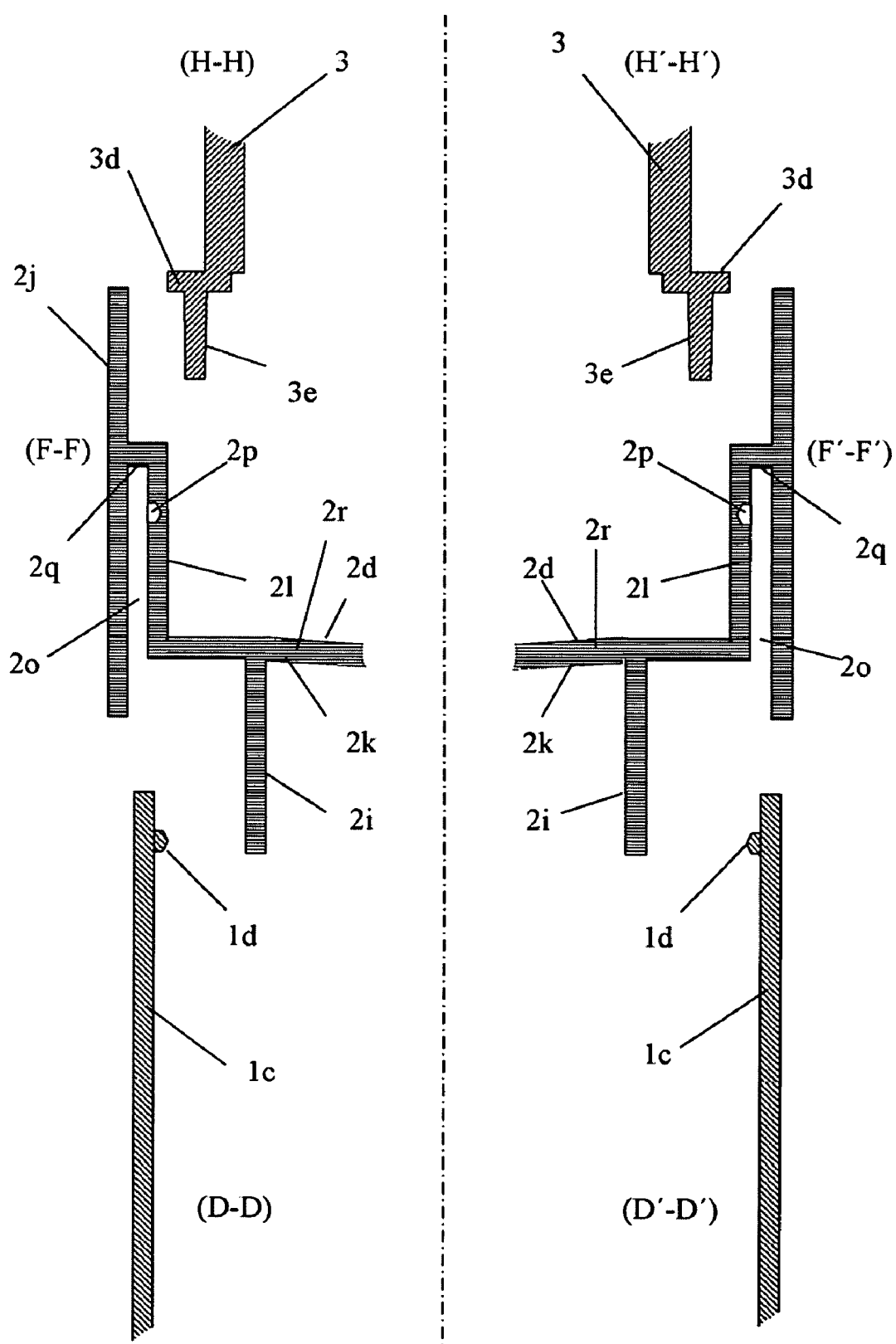
FIG. 17 corresponds to schematic sectional side views along planes D-D, D'-D' of the receptacle shown in FIG. 10, F-F, F'-F' of the support tray shown in FIG. 12, and H-H, H'-H' of the lid shown in FIG. 15.
Figure 18:
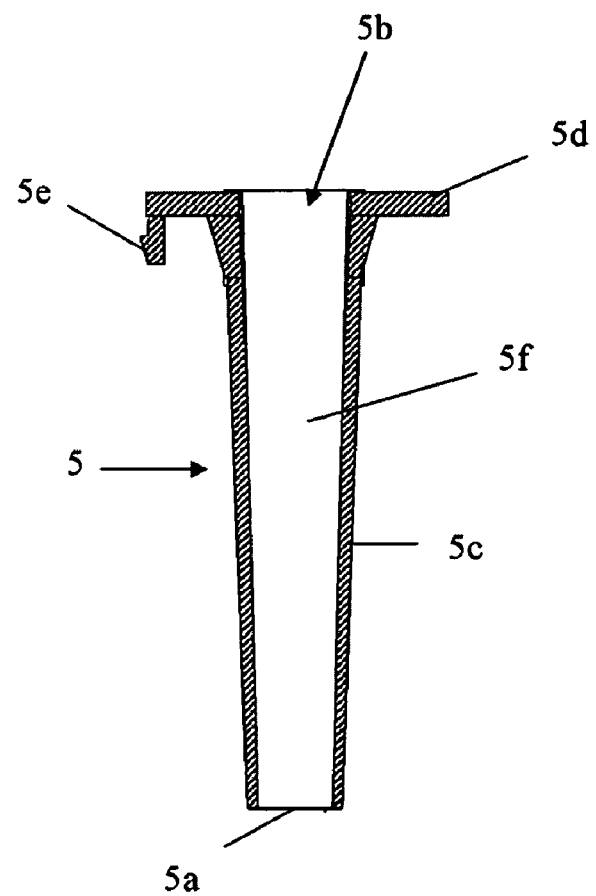
FIG. 18 shows a schematic sectional side view of an embodiment of the drainage tube of the device represented in FIG. 1.
Figure 19:
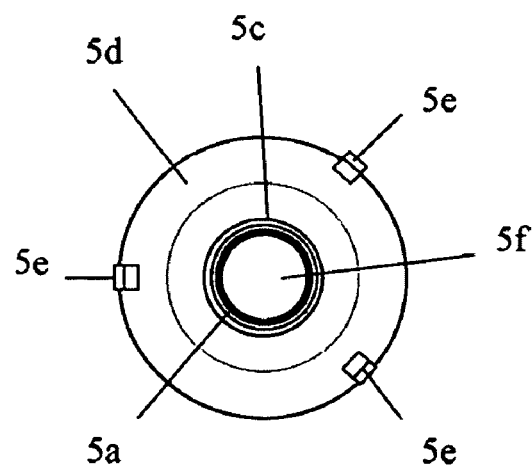
FIG. 19 shows a schematic lower plan view of the drainage tube shown in FIG. 18.
Figure 20:
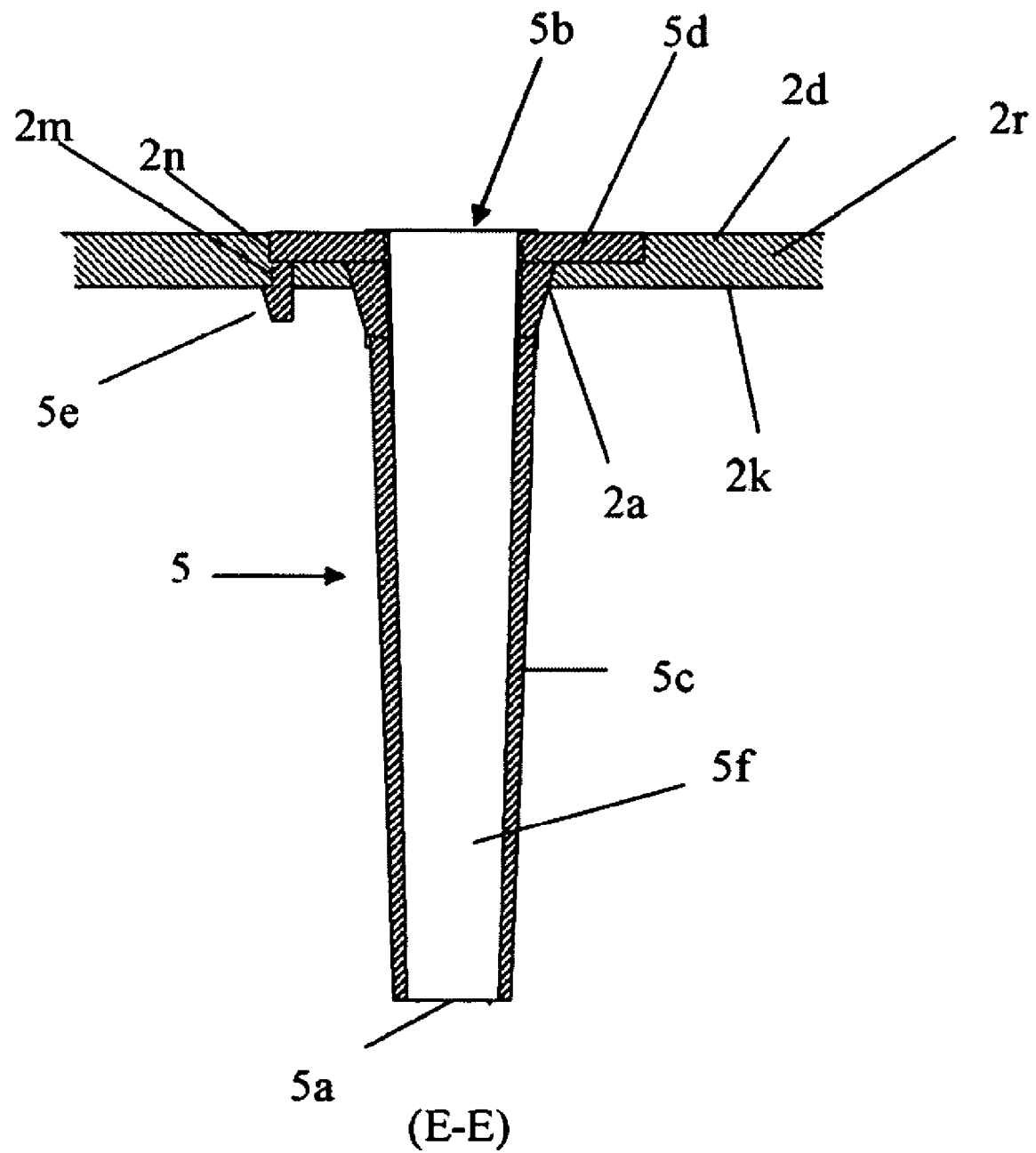
FIG. 20 shows a schematic sectional side view of the support tray and drainage tube, along plane E-E, shown in FIG. 12.
Figure 21:
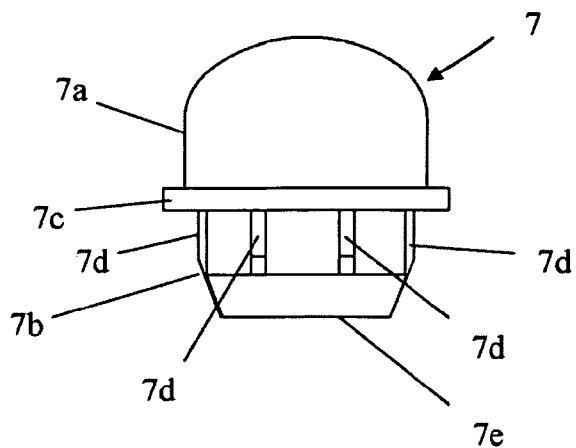
FIG. 21 shows a schematic sectional elevational side view of an embodiment of a sealing plug for the support tray evacuation orifice.
Figure 22:
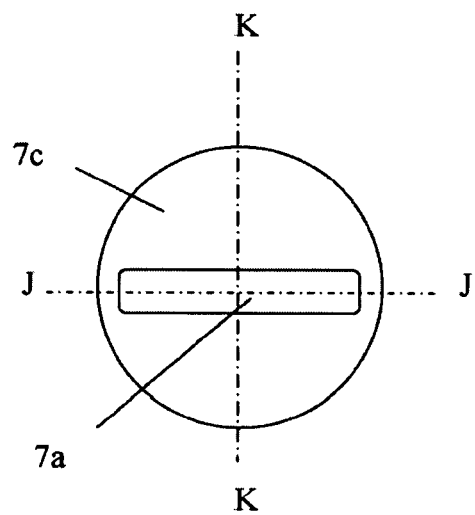
FIG. 22 shows a schematic upper plan view of the sealing plug shown in FIG. 21.
Figure 23:
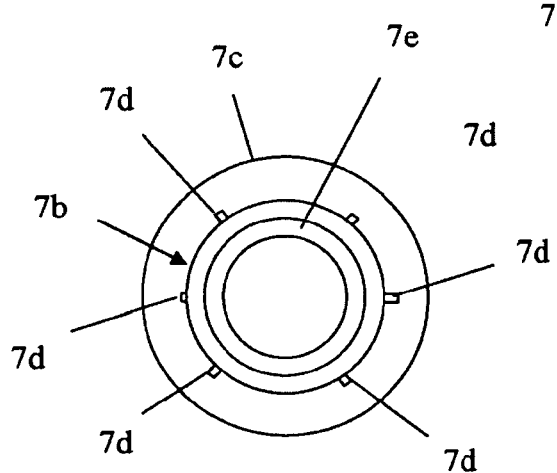
FIG. 23 shows a schematic lower plan view of the sealing plug shown in FIG. 21.
Figure 24:
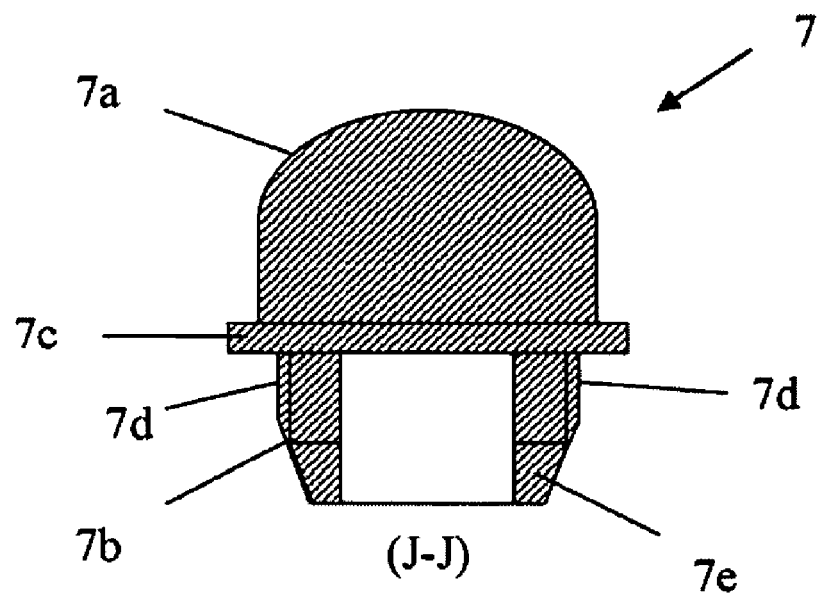
FIG. 24 shows a schematic sectional view along plane J-J of the sealing plug shown in FIG. 22.
Figure 25:
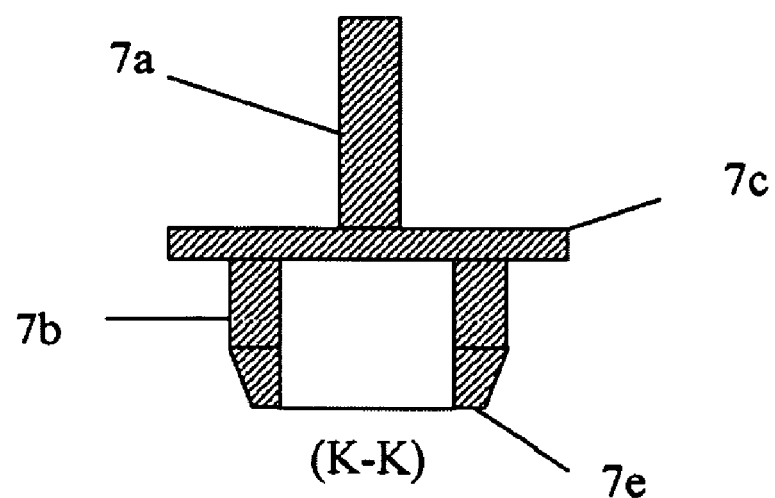
FIG. 25 shows a schematic sectional view along plane K-K of the sealing plug shown in FIG. 22.

These figures include references that identify the following elements:

1 receptacle
1a upper edge of receptacle
1b bottom of receptacle
1c wall of receptacle
1d inner recessed rib of receptacle
1e support flap
2 support tray
2a drainage hole
2b, 2b' recessed projection
2c support tray evacuation orifice
2d upper surface of support tray
2e central support projections
2f lateral support projections
2g, 2g' opening for recessed projection
2h centering projections for hygroscopic material
2i inner flap
2j outer flap
2k inner surface of support tray
2l wall of the support tray
2m recessed orifice for drainage tube
2n ring slot
2o gap between wall of tray and its outer flap
2p outer peripheral recess
2q support segment
2r base of tray
3 upper lid
3a ventilation hole
3b, 3b' horizontal recessed tongue
3c, 3c' opening in recessed tongue
3d peripheral flap of upper lid
3e peripheral vertical lower flange of upper lid
3f upper base of lid
4 hygroscopic material contained in a permeable receptacle
5 drainage tube
5a drainage tube outlet
5b drainage tube inlet
5c downward tilting part of drainage tube
5d upper ring widening
5e recessed swivel
5f inner channel
6 saline liquid in receptacle
7 sealing plug for evacuation orifice
7a upper part of plug
7b lower part of plug
7c ring flange
7d insertion ribs
7e lower outer part

EMBODIMENT OF THE INVENTION

In a first embodiment of the container device for en environmental humidity absorber with an anti-spill system of the present invention, represented in FIGS. 1 to 28, we can observe that it comprises a lower receptacle (1) to collect saline liquid (6), a support tray (2) for hygroscopic material (4) contained in a permeable receptacle, and an upper lid (3) with ventilation holes (3a), disposed over the tray (2). A drainage tube (5) that extends vertically towards the bottom (1b) of the receptacle (1) emerges from the drainage hole (2a).

The receptacle (1) has a bottom (1b), a wall (1c) and an upper edge (1a) that defines an upper opening. Similarly, it comprises a recessed rib (1d) that emerges peripherally from an inner upper side of its wall (1c) and fits into a peripheral inlet (2p) in an outer part of the wall (2l) of the tray (2). The receptacle (1) is also comprised of a support flap (1e) that extends vertically downwards from its bottom (1b).

In turn, the lid (3) comprises a closed upper base (3f), a peripheral flap (3d) that projects laterally from the lid (3) and rests on the wall (2l) of the tray, and a lower peripheral flange (3e) in contact with a lower part of the wall (2l) of the tray (2).

The tray (2) is sealed to the upper edge (1a) of the receptacle (1), and has a base (2r), an upper surface (2d) tilted towards and around a central drainage hole (2a), and a wall (2l) that peripherally defines the upper surface (2d) of the tray (2), and an upper surface (2k). Two vertical recessed projections (2b) which are embedded into the complementary openings (3c) of respective horizontal recessed tongues (3b) that emerge from either side of the lid (3), emerge from two opposed segments of the wall (2l) corresponding to the walls of the tray (2).

The tray (2) also comprises an outer flap (2j) that extends vertically downwards, and a horizontal support segment (2q) that extends towards the exterior of the tray (2) and joins the outer flap (2j) to the wall (2l) of the tray (2), in such a way that a gap (2o) in which the upper part of the wall (1c) of the receptacle (1) is embedded, is defined between the outer flap (2j), the support segment (2q) and the wall (2l) of the tray (2). The outer flap (2j) of the tray (2) has an upper vertical extension that surrounds at least one lower side of the lid (3). From each of the wall (2l) segments from which the recessed projections (2b) emerge, the upper vertical extension of the outer flap (2l) of the tray comprises an opening (2g) for the recessed projection (2b) that forms an access to the horizontal recessed tongue (3b) of the lid (3). A plurality of vertical support projections (2e, 2f) on which the permeable receptacle containing the hygroscopic material (4), emerge from the upper surface (2d) of the base (2r) of the support tray (2). Specifically, there are central support projections (2e) disposed radially around the drainage hole (2a), in addition to lateral support projections (2f) disposed between the drainage hole (2a) and the wall (2l) of the tray (2).

Similarly, the upper surface (2d) of the tray (2) has centering projections (2h) to maintain the receptacle that contains the hygroscopic material (4) in a stable, centered position. A lower flap, the function of which is described below, also emerges vertically from the lower surface (2k) of the tray (2).

The support tray (2) also comprises an evacuation orifice (2c) for the liquid (6), which can sealed with a removable plug (7) disposed close to the two adjacent parts of the wall (2l) of the support tray (2). Said plug (7) is comprised of an upper part (7a) resembling a flat vertical grip flap and a lower part (7b) that fits into the evacuation orifice (2c) that crosses the base (2r) of the support tray. A ring flange (7e) that extends further than the evacuation orifice (2c) emerges between the upper part (7a) and lower part (7b) of the plug (7). Vertical insertion ribs (7d) are disposed along the radial surface of the lower part (7b), while the lower extreme part (7e) has an inverse truncated-cone section that facilitates insertion of the plug (7) in the evacuation orifice.

The drainage tube (5) is comprised of an upper inlet (5b), a downward part (5c) inside of which an inner channel (5) with a slightly inverted truncated cone-shaped longitudinal section extends, and a lower outlet (5a) with a free edge substantially parallel and separated from the bottom of the receptacle (1b) and is removably embedded in the base (2r) of the tray (2). The drainage tube (5) inlet (5b) is surrounded by a ring widening (5d) that fits into a complementary ring slot (2n) that surrounds the drainage hole (2a). At least one recessed swivel (5e) embedded into a recessed orifice (2m) in the base (2r) of the tray (2) emerges from the lower part of the ring widening (5d).

Figure 26:
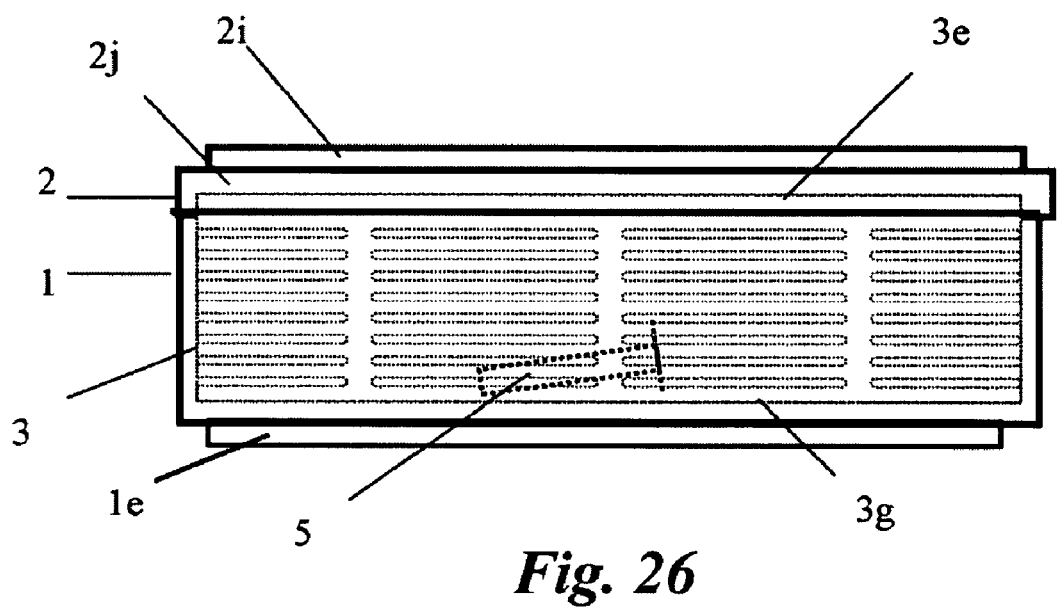
FIG. 26 shows an elevational side view of the device shown in the figure but with its elements disposed in storage position.
Figure 27:
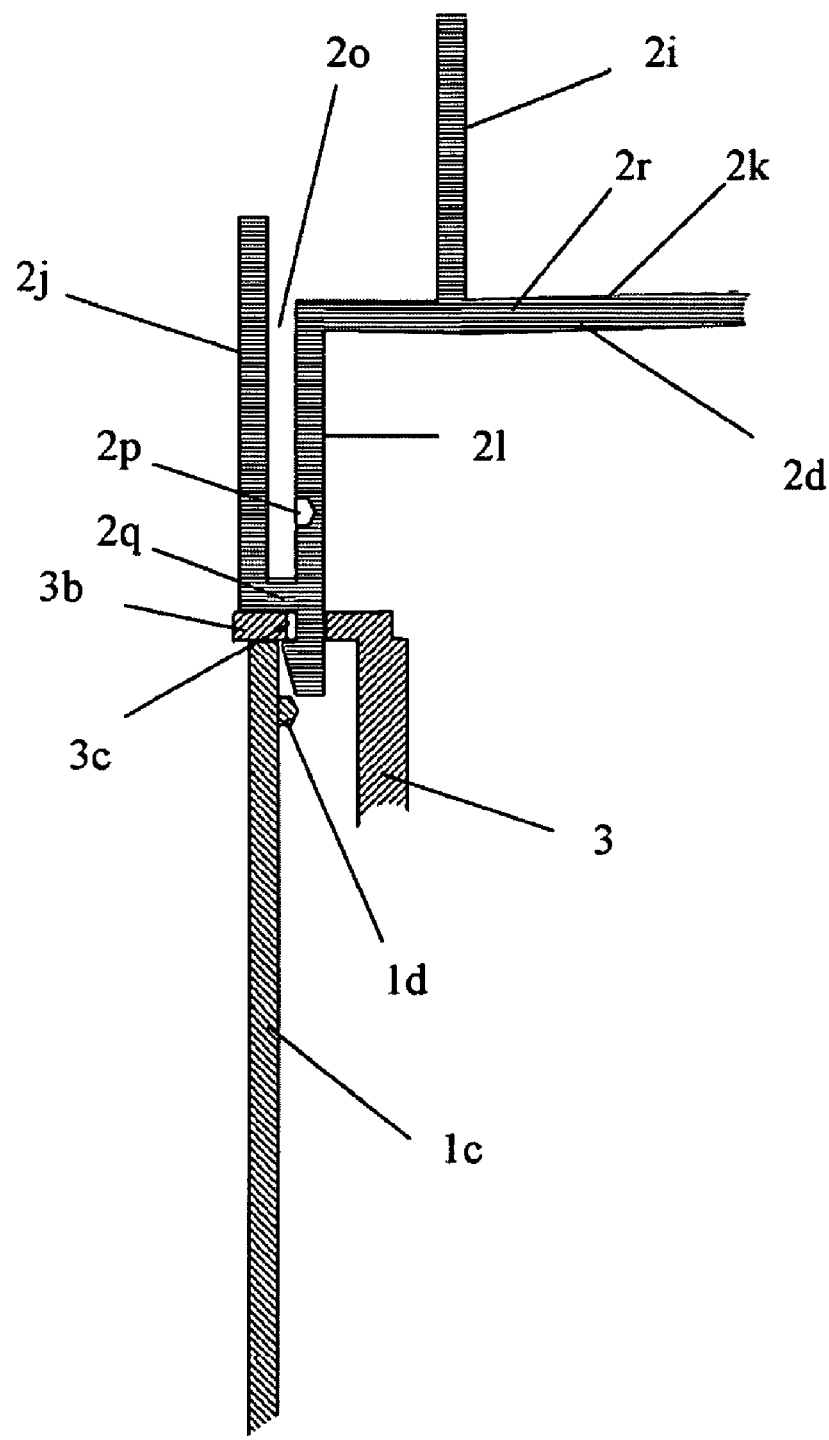
FIG. 27 shows a cross-sectional view along a side of the device represented in FIG. 26.
Figure 28:
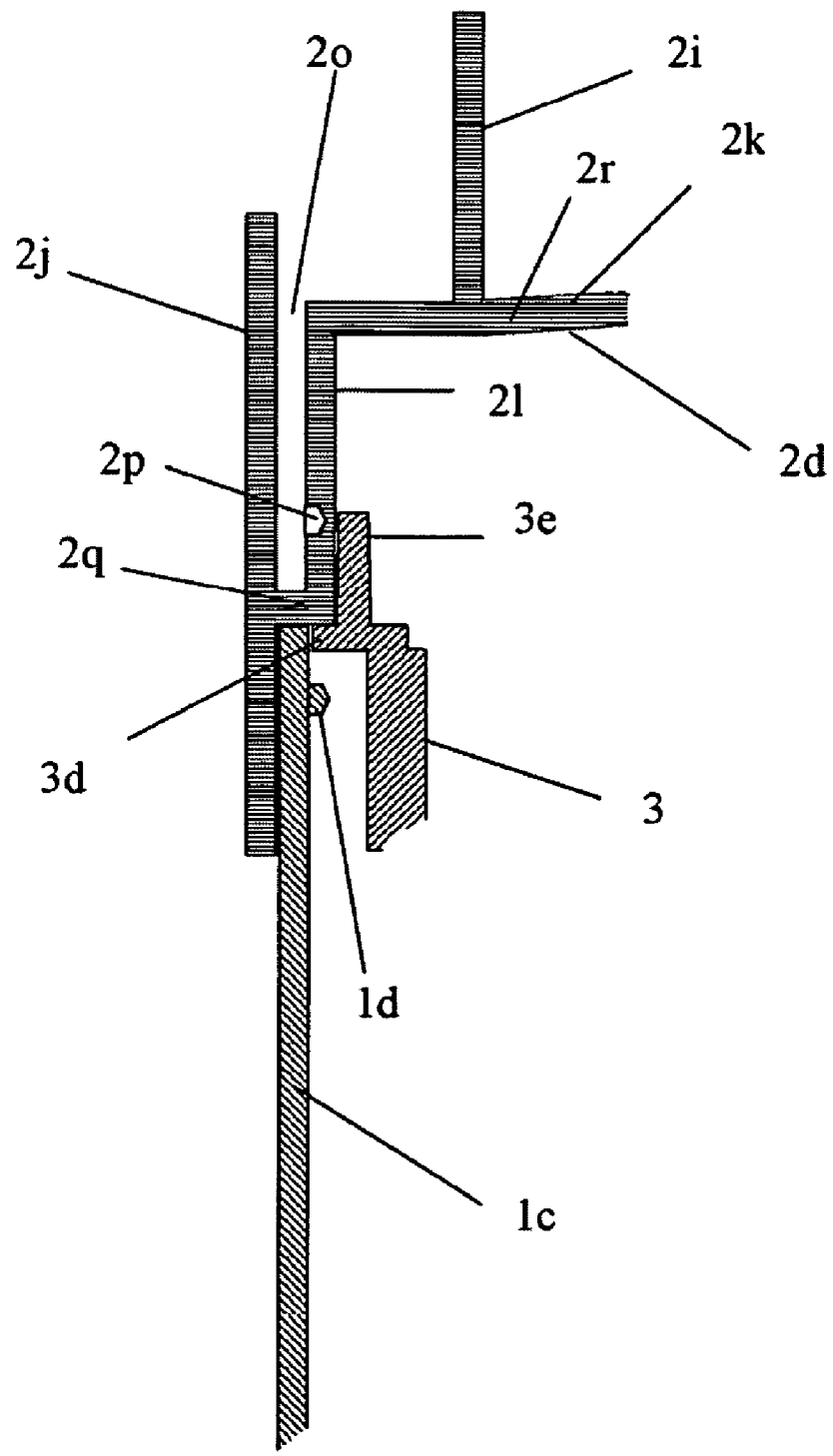
FIG. 28 shows a cross-sectional view along a wall of the device represented in FIG. 26.
Figure 29:
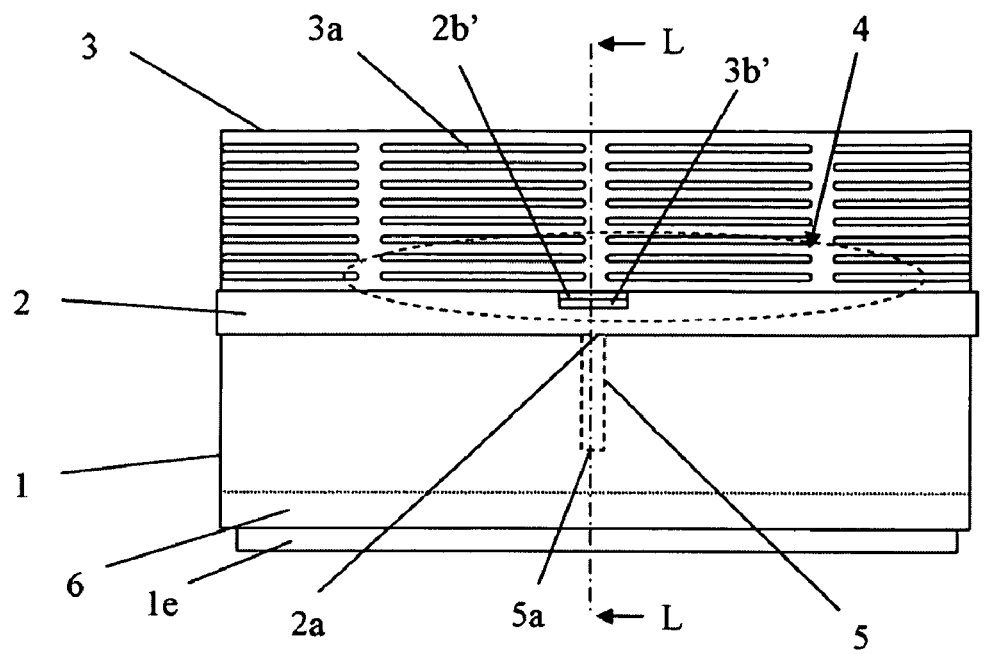
FIG. 29 shows a schematic elevational side view of the second embodiment of the device of the present invention.
Figure 30:
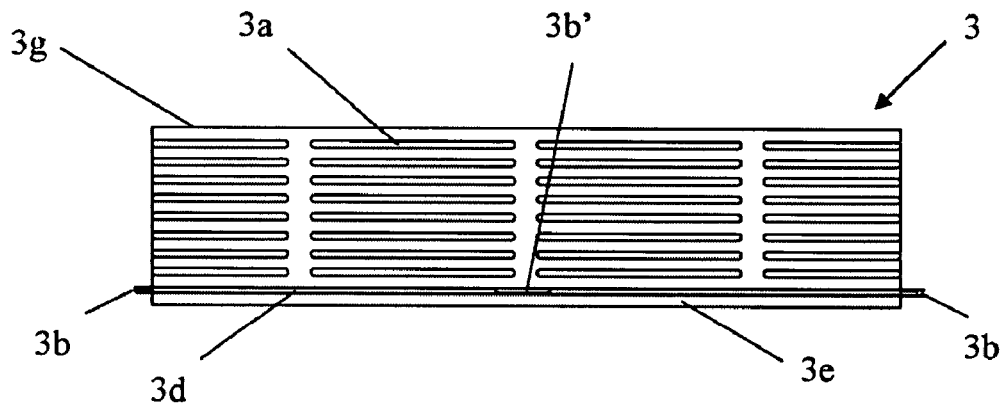
FIG. 30 shows a schematic elevational side view of the lid of the device represented in FIG. 29.
Figure 31:
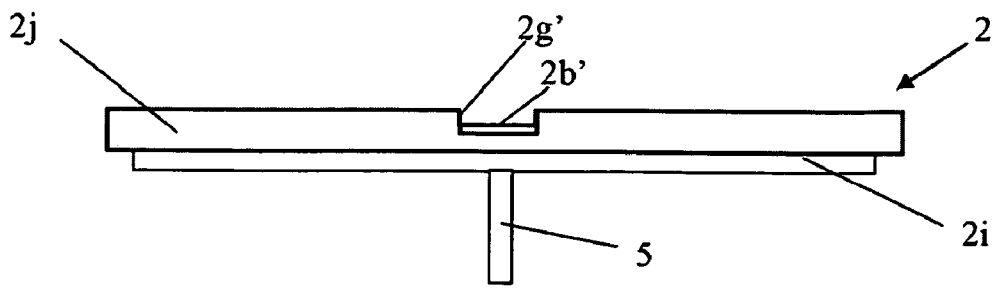
FIG. 31 shows a schematic elevational side view of the support tray of the device represented in FIG. 29.
Figure 32:
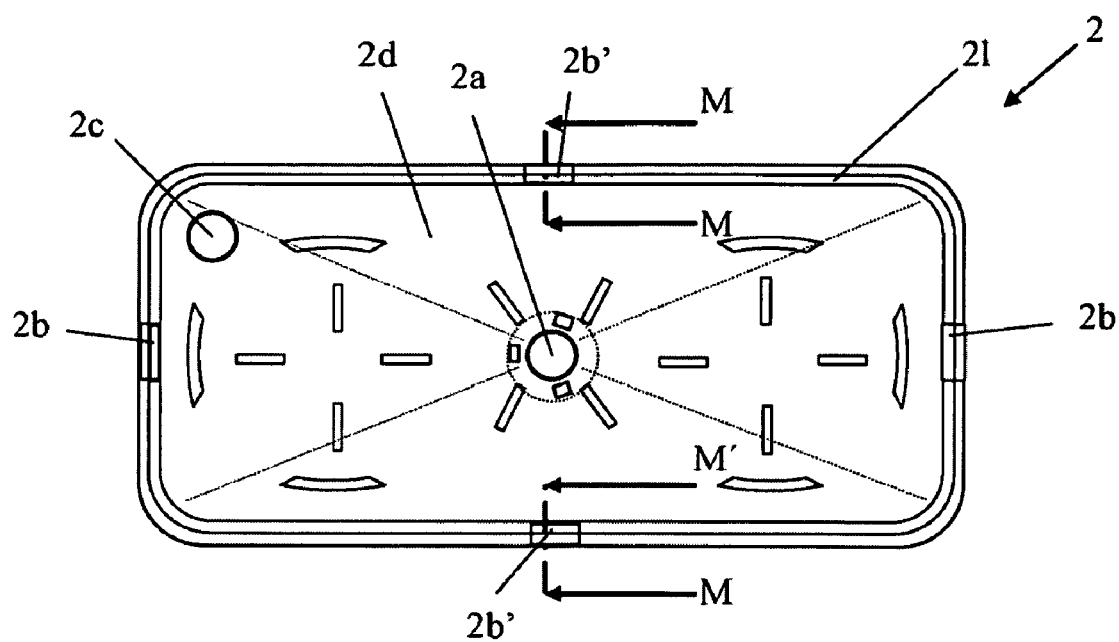
FIG. 32 shows a schematic upper plan view of an embodiment of the support tray of the device represented in FIG. 29.
Figure 33:
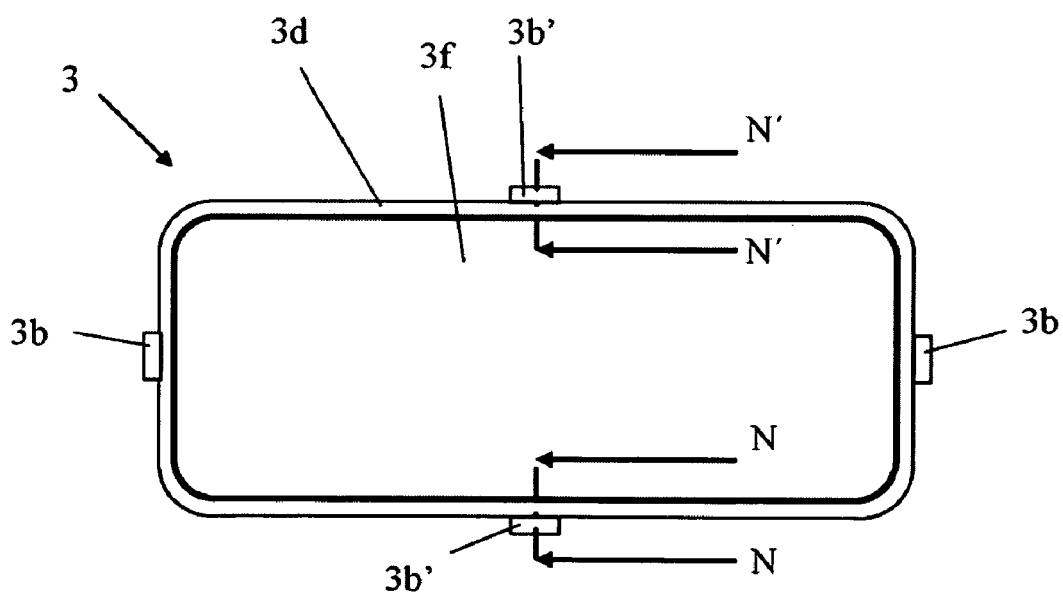
FIG. 33 shows a schematic lower plan view of an embodiment of the support tray of the device represented in FIG. 29.
Figure 34:
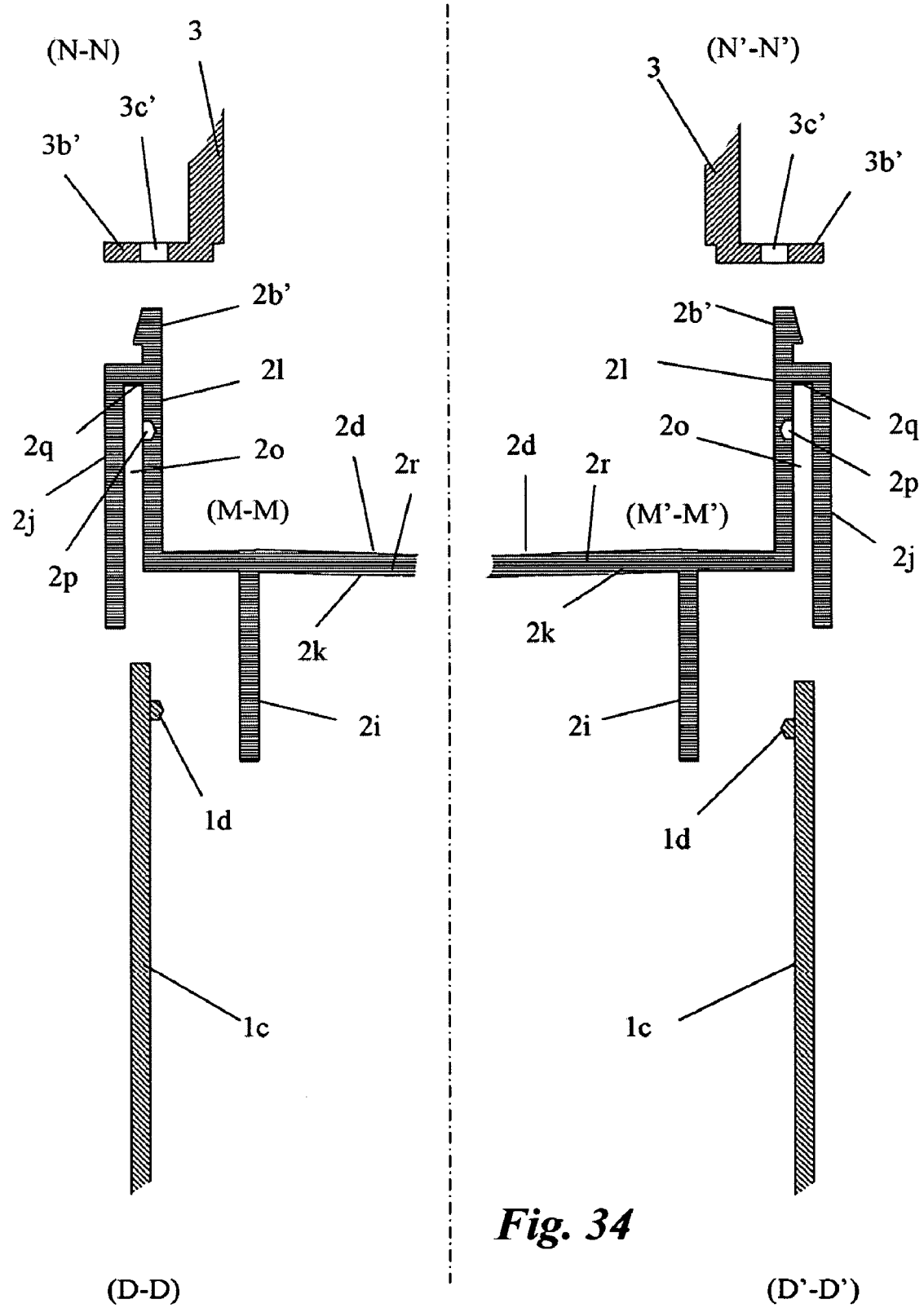
FIG. 34 corresponds to schematic sectional views respectively along planes D-D, D'-D' of the receptacle shown in FIG. 10, M-M, M'-M' of the support tray shown in FIG. 32, and N-N, N'-N' of the lid shown in FIG. 33.
Figure 35:
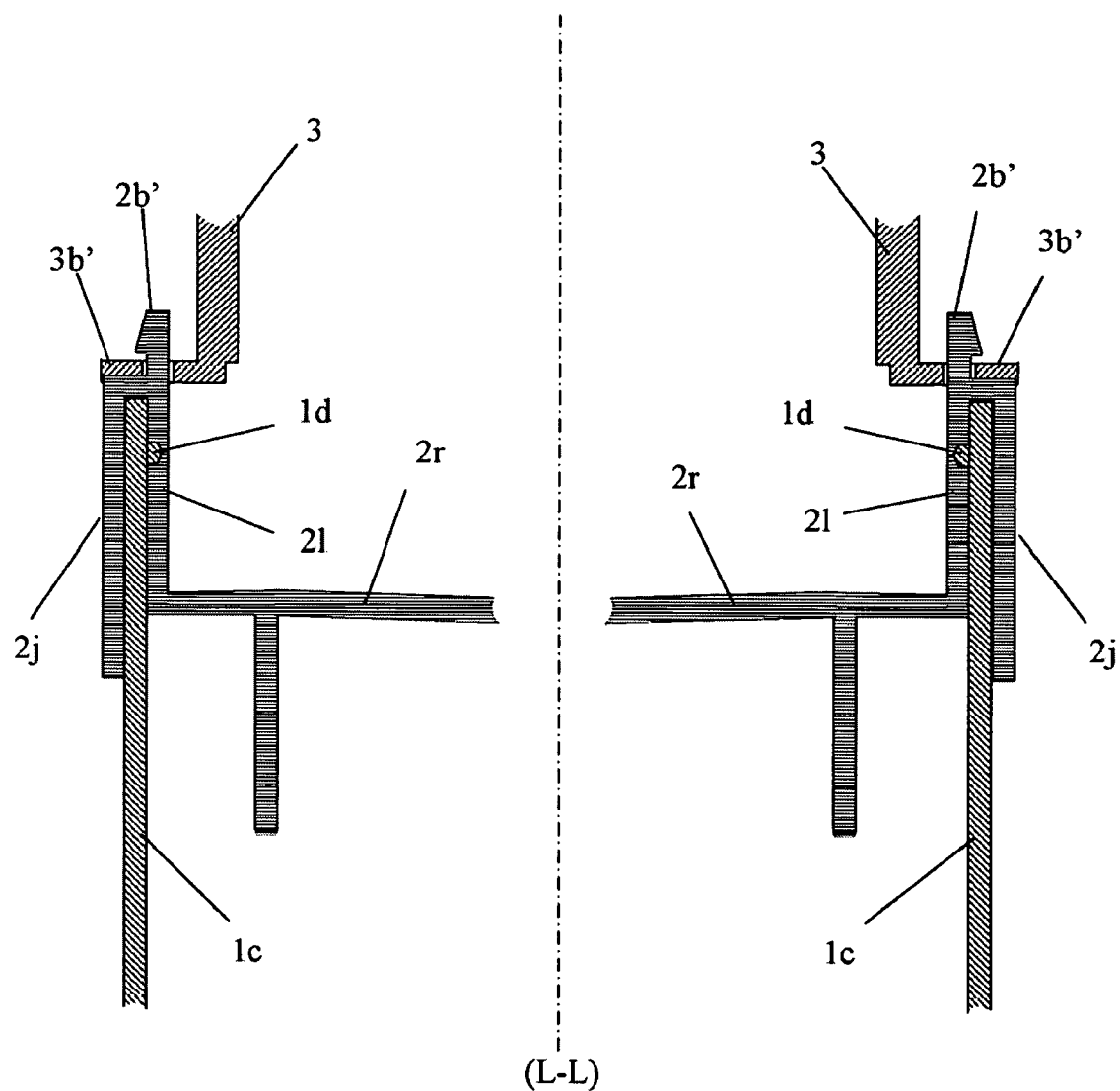
FIG. 35 shows a schematic sectional side view along plane L-L of the device represented in FIG. 29.

FIGS. 26 to 28 represent the device of the present invention in a storage position in which it should, logically, occupy the least possible space. In said position, the lid (3) is turned 180° and disposed over the interior of the receptacle (1), in such a way that the peripheral flap (3d) and the recessed tongue (3b) rest on the upper edge (1a) of the receptacle (1). The tray (2) is also turned 180° and disposed in such a way that its inner wall (2l) is in contact with the outer part of the peripheral vertical inner flange (3e), while its support segment (2q) rests on the peripheral flap (3d) and the recessed tongue (3b) of the lid (3). In turn, the recessed projection (2b) of the tray (2) is embedded into the opening (3c) of the recessed tongue (3b). The inner flap (2i) of the tray (2) is turned upwards in such a way that it provides a support means to pile another device with identical characteristics to those previously described, the support flap (1e') of which surrounds the inner flap (2i) of the tray and the bottom (1b') of which rests on the free edge of said support flap (1e) or, in another embodiment, on the lower upward-turned edge (2k) of the tray (2). On the other hand, the tube (5) has been disassembled and is inserted into the lid (3).

The second embodiment of the device of the present invention represented in FIGS. 29 to 35 is differentiated from the first embodiment fundamentally in that two lateral vertical recessed projections (2b) emerge from two lateral segments opposite the wall (2l) of the tray (2), which are embedded into the complementary openings (3c) of respective lateral horizontal recessed tongues (3b') that emerge from either side of the lid (3). In this second embodiment, in each of the lateral wall segments (2l) from which the lateral recessed projections (2b) emerge, the upper vertical extension of the outer flap (2l) of the tray comprise an opening (2g') for the lateral recessed projection (2b') that forms an access to the lateral horizontal recessed tongue (3b') of the lid (3). The ultimate purpose of the two additional lateral recessed units formed by the lateral recessed projections (2b') and the lateral recessed tongues (3b') with their respective openings (3c'), respectively, is to reinforce the join between the lid (3) and the tray (2), which is particularly useful when the container device has extending sides.

The invention claimed is:
1. Container device for an environmental humidity absorber with an anti-spill system which comprises:
   a lower receptacle (1) to collect saline liquid (6), with a bottom (1b), a wall (1c) and an upper edge (1a) that defines an upper opening;
   a support tray (2) for hygroscopic material (4) contained in a permeable receptacle, sealed to the upper edge (1a) of the receptacle (1), which has a base (2r), an upper surface (2d) tilted towards and around a central drainage hole (2a), and a wall (2l) that peripherally defines the upper surface (2d) of the tray (2), and a lower surface (2k);
   a drainage tube (5) that extends vertically from the drainage hole (2a) towards the bottom (1b) of the receptacle (1), which comprises an upper opening (5b), a downward part (5c) and a lower outlet (5a) separated from the bottom of the receptacle (1b);
   an upper lid (3) with ventilation holes (3a), disposed over the tray (2) which has less height than an inner height of the receptacle (1);
   characterized in that
   the receptacle (1) comprises a recessed rib (1d) that emerges peripherally from an inner upper side of its wall (1c) and fits into a peripheral inlet (2p) in an outer part of the wall (2l) of the tray (2);
   the lid (3) comprises a peripheral flap (3d) that projects laterally from the lid (3) and rests on the wall (2l) of the tray, and a lower peripheral flange (3e) in contact with an inner part of the wall (2l) of the tray (2);
   two vertical recessed projections (2b, 2b') that fit into the complementary openings (3c, 3c') of respective horizontal recessed tongues (3b, 3b') that emerge from opposite sides of the lid (3), emerge from at least two respective opposing segments of the wall (2l) of the tray (2); and
   the drainage tube is removably embedded into the base (2r) of the tray (2).

2. Device, according to claim 1, characterized in that it comprises two vertical recessed projections (2b) embedded into the complementary openings (3c) of respective horizontal recessed tongues (3b) that emerge from either wall of the lid (3).

3. Device, according to claim 1, characterized in that it comprises two lateral vertical recessed projections (2b') embedded into the complementary openings (3c') of respective lateral horizontal recessed tongues (3b') that emerge from either side of the lid (3).

4. Device, according to claim 1, characterized in that the tray (2) also comprises an outer flap (2) that extends vertically downwards, and a horizontal support segment (2q) that extends towards the exterior of the tray (2) and joins the outer flap (2j) to the wall (2l) of the tray (2), in such a way that between the outer flap (2j), the support segment (2q) and the wall (2l) of the tray (2), a gap (2o) is defined into which the upper part of the wall (1c) of the receptacle (1) fits.

5. Device, according to claim 4, characterized in that the outer flap (2j) of the tray (2) comprises an upper vertical extension that surrounds at least one inner side of the lid (3).

6. Device, according to claim 5, characterized in that at least one of the wall segments (2l) from which the recessed projections (2b, 2b') emerge, the upper vertical extension of the outer flap (2j) of the tray comprises an opening (2g, 2g') for the recessed projection (2b, 2b'), which forms an access to the horizontal recessed tongue (3b, 3b') of the lid (3).

7. Device, according to claim 1, characterized in that the inlet (5b) of the drainage tube (5) is surrounded by a ring widening (5d) that fits into a complementary ring slot (2n) that surrounds the drainage hole (2a); and
 at least one recessed swivel (5e) that fits into a recessed orifice (2m) at the base (2r) of the tray (2) emerges from the lower part of the ring widening (5d).

8. Device, according to claim 1, characterized in that the support tray (2) comprises an evacuation orifice (2c) for the liquid (6), which can be sealed by a removable plug (7).

9. Device, according to claim 8, characterized in that the evacuation orifice (2c) is disposed close to at least one wall segment (2l) of the tray (2) and separated from the drainage hole (2a).

10. Device, according to claim 8, characterized in that the tray has a substantially polygonal cross-section and the evacuation orifice (2c) is disposed close to the two adjacent parts of the wall (2l) of the support tray (2).

11. Device, according to claim 1, characterized in that the upper surface (2d) of the base (2r) of the support tray (2) has a plurality of vertical support projections (2e, 2f) on which the permeable receptacle containing the hygroscopic material (4) rests.

12. Device, according to claim 11, characterized in that the plurality of support projections comprises central support projections (2e) radially disposed around the drainage hole (2a).

13. Device, according to claim 11, characterized in that the plurality of support projections comprises lateral support projections (2f) disposed between the drainage hole (2a) and the wall (2l) of the tray (2).

14. Device, according to claim 13, characterized in that the radial support projections (2e) are higher than the lateral support projections (2f).

15. Device, according to claim 11, characterized in that the upper surface (2d) of the tray (2) has centering projections (2h) to maintain the receptacle that contains the hygroscopic material (4) in a stable, centered position.

* * * * *